(12) United States Patent
Suryawanshi et al.

(10) Patent No.: US 11,978,165 B2
(45) Date of Patent: May 7, 2024

(54) SYSTEM AND METHOD FOR GENERATING RECOMMENDATIONS FOR CAPTURING IMAGES OF REAL-LIFE OBJECTS WITH ESSENTIAL FEATURES

(71) Applicant: Wipro Limited, Bangalore (IN)

(72) Inventors: Shrivardhan Satish Suryawanshi, Sangli (IN); Gopichand Agnihotram, Bangalore (IN); Vivek Kumar Varma Nadimpalli, Schaumburg, IL (US)

(73) Assignee: Wipro Limited, Bangalore (IN)

( * ) Notice: Subject to any disclaimer, the term of this patent is extended or adjusted under 35 U.S.C. 154(b) by 44 days.

(21) Appl. No.: 17/804,891

(22) Filed: Jun. 1, 2022

(65) Prior Publication Data

US 2023/0316664 A1  Oct. 5, 2023

(30) Foreign Application Priority Data

Mar. 31, 2022  (IN) .............................. 202241019742

(51) Int. Cl.
*G06V 20/20* (2022.01)
*G06T 7/73* (2017.01)
*G06T 19/00* (2011.01)

(52) U.S. Cl.
CPC .............. *G06T 19/006* (2013.01); *G06T 7/73* (2017.01); *G06V 20/20* (2022.01); *G06T 2207/30204* (2013.01)

(58) Field of Classification Search
CPC ..................... G06T 19/006; G06T 7/73; G06T 2207/30204; G06V 20/20
See application file for complete search history.

(56) References Cited

U.S. PATENT DOCUMENTS

| | | | |
|---|---|---|---|
| 9,521,321 B1* | 12/2016 | Kozko | H04N 23/698 |
| 2014/0368533 A1* | 12/2014 | Salter | G06F 3/04815 |
| | | | 345/619 |
| 2016/0247324 A1 | 8/2016 | Mullins et al. | |
| 2018/0137685 A1 | 5/2018 | Montgomerie et al. | |
| 2019/0149725 A1 | 5/2019 | Adato et al. | |
| 2021/0142579 A1* | 5/2021 | Jeong | G06T 7/251 |
| 2022/0028100 A1* | 1/2022 | Doganis | G06T 15/06 |

FOREIGN PATENT DOCUMENTS

WO  2019193364 A1  10/2019

* cited by examiner

*Primary Examiner* — Jitesh Patel
(74) *Attorney, Agent, or Firm* — Finnegan, Henderson, Farabow, Garrett & Dunner LLP

(57) ABSTRACT

The disclosure relates to system and method for generating recommendations for capturing images of a real-life object with essential features. The method includes detecting an Augmented Reality (AR) plane for a target object. The method further includes capturing a set of poses corresponding to the target object and a set of coordinate points in the AR plane. The set of poses includes a tracking marker, and the set of coordinate points indicates a location of the target object. The method further includes determining an instant distance between the AR imaging device and the target object, and an instant angle of the AR imaging device with respect to the target object. The method further includes dynamically generating the recommendations for adjusting a position and an orientation of the AR imaging device with respect to the target object.

18 Claims, 4 Drawing Sheets

SYSTEM AND METHOD FOR GENERATING RECOMMENDATIONS FOR CAPTURING IMAGES OF REAL-LIFE OBJECTS WITH ESSENTIAL FEATURES

TECHNICAL FIELD

The present disclosure relates generally to Augmented Reality (AR), and more particularly to system and method for generating recommendations for capturing images of a real-life object with essential features.

BACKGROUND

In conventional systems, users capture or record real life objects manually without any guidance. Sometimes, such recordings lack in covering all essential features of an object. Therefore, the recordings are unusable for Augmented Reality and Virtual Reality (AR-VR) applications. In other words, there is a possibility to miss out a few angles and orientations of the object (i.e., object features), thereby making content insufficient to train object detection models. Further, the object detection models trained with such content are likely to fail in effective object detection as the essential features of the object are not covered in the content.

By way of an example, in case of a machine, an expert must visit a machine location to capture/record essential features of the machine. This manual process is a tedious task as the expert needs to manually capture the essential features of the machine at different angles/orientations. Further, a machine learning model needs a huge content for training and object detection (for example, for machines/machine parts) in real time. Moreover, with prior knowledge on capturing the content, the expert needs to refer to standard documentations continuously.

Various existing systems are available to generate recommendations for capturing images of a real-life object. Some of the existing systems focus on misplaced product identification and providing augmented guidance (i.e., navigation) to the user to the misplaced products. Additionally, the existing systems focus on creating virtual content with respect to the real objects. This virtual content may then be ported onto Head Mounted Display (HMD) devices to augment content of real-world. However, the existing systems lack capturing the content as per standard operating procedures. Moreover, the existing systems require human intervention to capture the content and do not provide any guided instructions/recommendations to the user to capture/record the content without missing the essential features of the object.

SUMMARY

In one embodiment, a method of generating recommendations for capturing images of a real-life object with essential features is disclosed. In one example, the method may include detecting an Augmented Reality (AR) plane for a target object, based on a cluster of feature points that appear to lie on a common horizontal surface or on a common vertical surface. The method may further include capturing a set of poses corresponding to the target object and a set of coordinate points in the AR plane. It should be noted that the set of poses may include a tracking marker and the set of coordinate points may indicate a location of the target object. The method may further include determining an instant distance between the AR imaging device and the target object based on the set of co-ordinate points, and an instant angle of the AR imaging device with respect to the target object based on the set of poses and the tracking marker. The method may further include dynamically generating the recommendations for adjusting a position and an orientation of the AR imaging device with respect to the target object, based on the instant distance and the instant pose, to capture a plurality of images of the target object that include essential features of the target object.

In another embodiment, a system for generating recommendations for capturing images of a real-life object with essential features is disclosed. In one example, the system may include a processor and a memory communicatively coupled to the processor. The memory may store processor-executable instructions, which, on execution, may cause the processor to detect an Augmented Reality (AR) plane for a target object, based on a cluster of feature points that appear to lie on a common horizontal surface or on a common vertical surface. The processor-executable instructions, on execution, may further cause the processor to capture a set of poses corresponding to the target object and a set of coordinate points in the AR plane. It should be noted that the set of poses may include a tracking marker and the set of coordinate points may indicate a location of the target object. The processor-executable instructions, on execution, may further cause the processor to determine an instant distance between the AR imaging device and the target object based on the set of co-ordinate points, and an instant angle of the AR imaging device with respect to the target object based on the set of poses and the tracking marker. The processor-executable instructions, on execution, may further cause the processor to dynamically generate the recommendations for adjusting a position and an orientation of the AR imaging device with respect to the target object, based on the instant distance and the instant pose, to capture a plurality of images of the target object that include essential features of the target object.

In yet another embodiment, a non-transitory computer-readable medium storing computer-executable instruction for generating recommendations for capturing images of a real-life object with essential features is disclosed. In one example, the stored instructions, when executed by a processor, may cause the processor to perform operations including detecting an Augmented Reality (AR) plane for a target object, based on a cluster of feature points that appear to lie on a common horizontal surface or on a common vertical surface. The operations may further include capturing a set of poses corresponding to the target object and a set of coordinate points in the AR plane. It should be noted that the set of poses may include a tracking marker and the set of coordinate points may indicate a location of the target object. The operations may further include determining an instant distance between the AR imaging device and the target object based on the set of co-ordinate points, and an instant angle of the AR imaging device with respect to the target object based on the set of poses and the tracking marker. The operations may further include dynamically generating the recommendations for adjusting a position and an orientation of the AR imaging device with respect to the target object, based on the instant distance and the instant pose, to capture a plurality of images of the target object that include essential features of the target object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
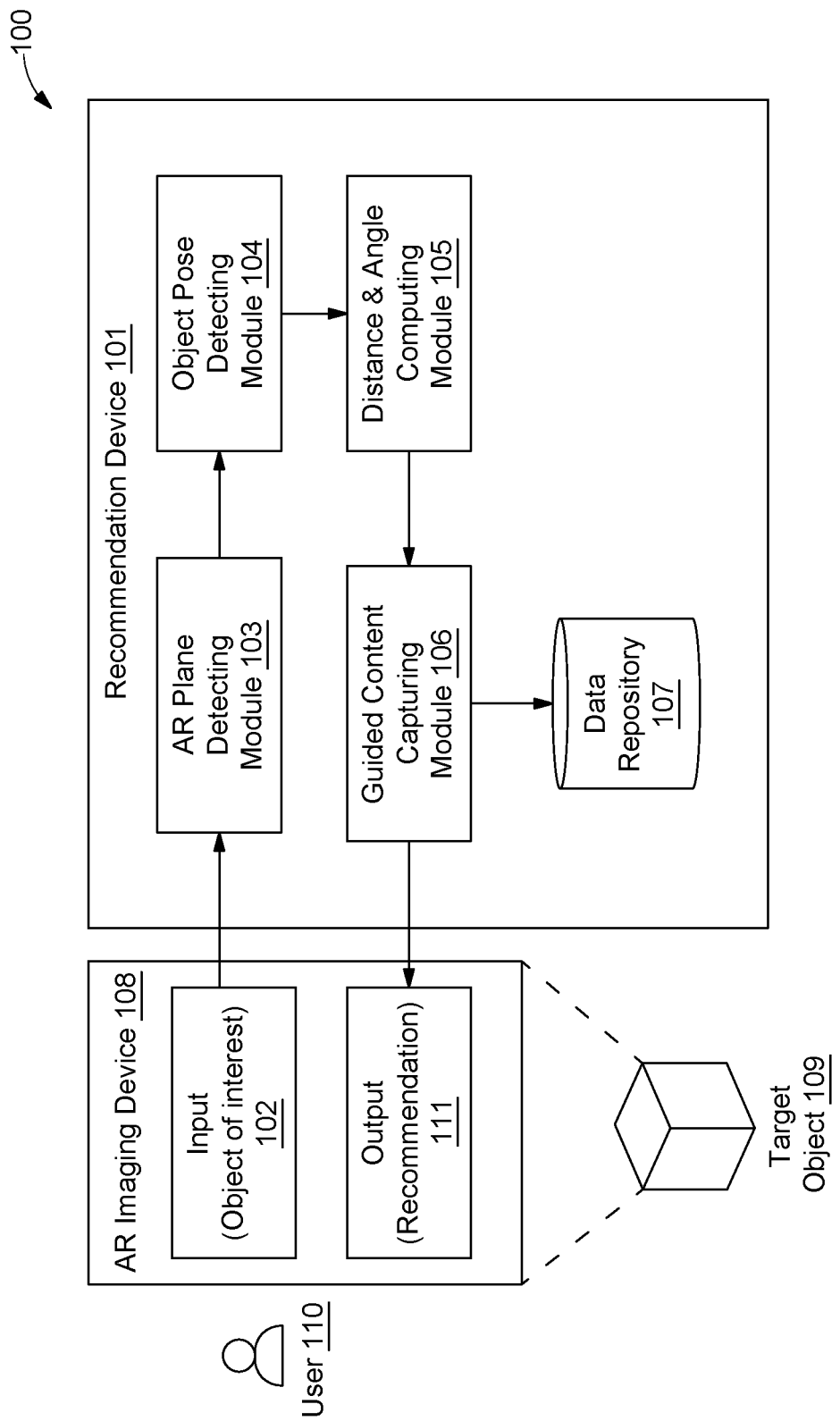
FIG. 1 is a block diagram of an exemplary system for generating recommendations for capturing images of a real-life object with essential features, in accordance with some embodiments of the present disclosure.

Referring now to FIG. 1, a block diagram of an exemplary system 100 for generating recommendations for capturing images of a real-life object with essential features is illustrated, in accordance with some embodiments of the present disclosure. The system 100 may generate guided recording to effectively adjust a position and an orientation of an AR imaging device 108 to capture a real-life object with essential features, for specific Augmented Reality and Virtual Reality (AR-VR) applications. The system 100 may include a recommendation device 101 which may perform various operations to generate the recommendations. Further, the recommendation device 101 may include various modules such as an AR plane detecting module 103, an object pose detecting module 104, a distance and angle computing module 105, and a guided content capturing module 106. The recommendation device 101 may also include a data repository 107 to store content (e.g., AR model of the object, etc.) generated by the recommendation device 101.

An object of interest (i.e., a real-life target object 109) may be provided as an input 102 to the AR plane detecting module 103 of the recommendation device 101. In other words, the AR plane detecting module 103 may be configured to receive the input 102 that indicates the object of interest from a user 110. Further, the AR plane detecting module 103 may be configured to detect an AR plane for the target object 109. It should be noted that the AR plane may be detected based on a cluster of feature points that appear to lie on a common horizontal surface or on a common vertical surface. In some embodiments, a boundary of the AR plane may be detected upon detecting the AR plane.

In some embodiments, after receiving the input 102, the AR plane detecting module 103 may detect a surface, an object, and a plane around the target object 109. In an embodiment, the AR plane may be detected using a scene from a library in an AR core. As will be appreciated, the AR core may be software development kit (SDK) stored in the datastore 107 that enables building AR application. Once the AR plane is detected, the object of interest may be identified around the AR plane and a marker may be placed on the object of interest to generate the content. Further, the AR plane detecting module 103 may be communicatively coupled to the object pose detecting module 104.

The object pose detecting module 104 may be configured to receive object related information from the AR plane detecting module 103. The object pose detecting module 104 may capture a set of poses corresponding to the object and a set of coordinate points in the AR plane. It should be noted that the set of poses may include a tracking marker and the set of coordinate points may indicate a location of the target object 109. In an embodiment, the target object 109 may be tracked, and a pose may be computed with the help of the tracking marker.

Initially, the AR plane may be detected near the target object 109 in real time and the tracking marker may be placed on middle of the object. Further, in some embodiments, a distance and an angle may be computed from the tracking marker to a camera pose (i.e., to the AR imaging device 108). Additionally, in some embodiments, a camera such as the AR imaging device 108 may be oriented around the object in a 360-degree view to obtain different poses of the object and object content (such as, images and videos) using the tracking marker. Further, the object pose detecting module 104 may be operatively coupled to the distance and angle computing module 105.

The distance and angle computing module 105 may be configured to receive object pose information from the object pose detecting module 104. The distance and angle computing module 105 may determine an instant distance between the AR imaging device 108 and the target object 109, and an instant angle of the AR imaging device 108 with respect to the target object 109. It should be noted that the instant distance may be determined based on the set of co-ordinate points. Similarly, the instant angle may be determined based on the set of poses and the tracking marker.

In particular, after receiving the object related information, in some embodiments, the tracking marker may be placed on the target object 109 or a view of the target object 109 by the user 110. The distance and angle computing module 105 may then compute the distance of the object to the camera such as the AR imaging device 108, and the angle of the camera pose (i.e., of the AR imaging device 108) to the target object 109. The tracking marker may be used to track the target object 109 and compute the angles at different orientations to cover the 360-degree view of the target object 109. In an embodiment, the distance and angle computing module 105 may compute horizontal angles to cover at least a part of a three-sixty-degree view of the target object 109 from a front side or a rear side. In some other embodiments, vertical angles may be computed by the distance and angle computing module 105 to cover at least a part of the three-sixty-degree view of the target object 109 from a top side or a bottom side. Therefore, the target object 109 may be covered in 360-degree view. This may help the user to create the AR content by capturing the target object 109 at every angle and every essential feature of the object to train an object detection model.

By way of an example, the distance and angle computation may also be extended for creating content related to different repair and maintenance procedures of the objects in 360-degree view. The distance and angle computing module 105 may be communicatively coupled to the guided content capturing module 106.

The guided content capturing module 106 may be configured to receive information related to the distance between the target object 109 and the camera (the AR imaging device 108), and the angle of the AR imaging device 108 with respect to the target object 109. The guided content capturing module 106 may dynamically generate the recommendations 111 for adjusting a position and an orientation of the AR imaging device 108 with respect to the target object 109. The recommendations 111 may be generated based on the instant distance and the instant pose, to capture a plurality of images of the target object 109. The plurality of images may include essential features of the target object 109.

Further, in some embodiments, various orientations of the target object 109 may be computed from the marker to the AR imaging device 108 with user guided procedures. The guided content capturing module 106 may be configured to guide the user 110 to capture the target object 109 covering the essential features with different directions. It should be noted that instructions about movement in the different directions may be displayed to the user 110. Further, the guided content capturing module 106 may be configured to hide the AR plane and the marker while capturing the images and videos of target object 109. As illustrated in FIG. 1, the guided content capturing module 106 may be coupled to the data repository 107 (also referred to as a datastore).

The data repository 107 may receive the captured content from the guided content capturing module 106. Once the content is captured at every orientation of the object and at an optimal distance, the content may be stored in the data repository 107 and subsequently shared with a server. The content may be further used for training AR models. In an embodiment, this solution may be provided as an application to the users 110 and may be ported into AR enabled mobile devices to generate the content around the devices in real time with guided instructions.

In some embodiments, a plurality of images of the target object may be captured dynamically based on the recommendations from a plurality of positions and a plurality of orientations. It should be noted that the plurality of images may be employed to generate a three-dimensional (3D) virtual image of the target object 109. Further, in some embodiments, the 3D virtual image of the target object 109 may be overlayed on top of an image captured using the AR imaging device 108 and the tracking marker may be placed on the 3D virtual image of the target object 109.

Thus, the system 100 is efficient to provide guidance to a user to effectively adjust position and orientation of the AR imaging device so that a real-life object with essential features may be captured. The system 100 also optimizes need for huge data for training an object-detection-model by effectively capturing appropriate content including essential features of the target object 109.

Figure 2:
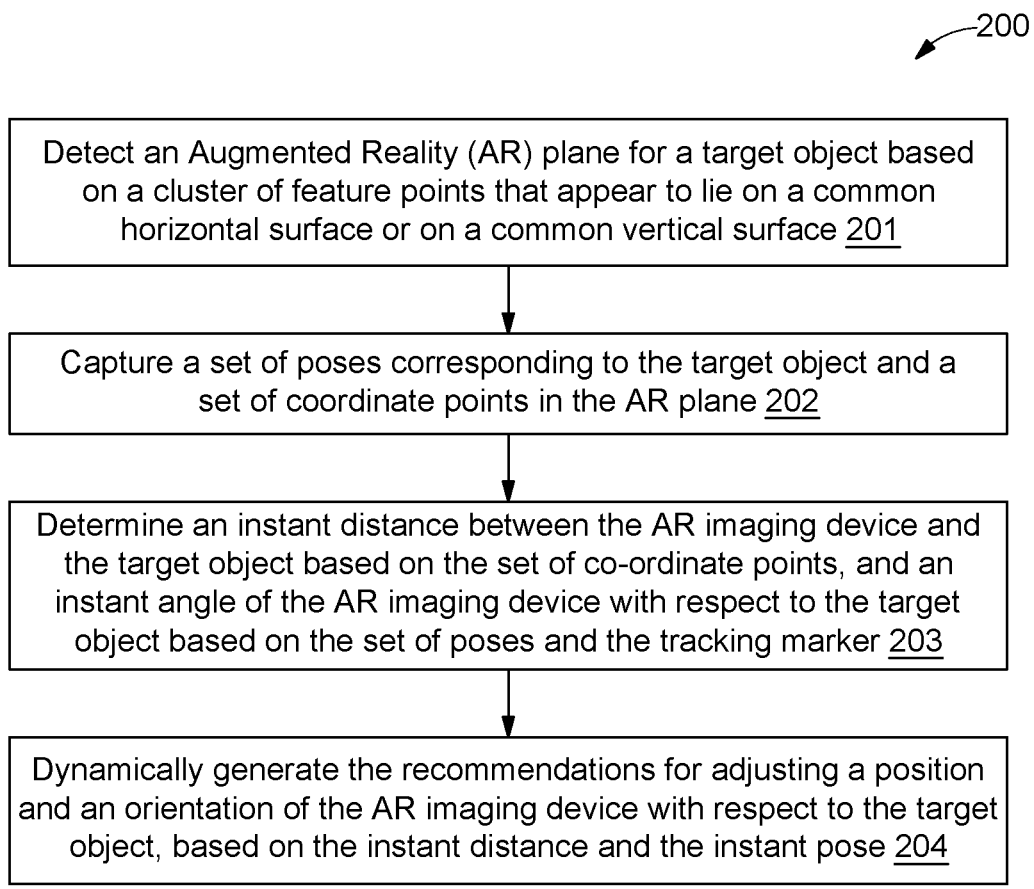
FIG. 2 is a flow diagram of an exemplary process for generating recommendations for capturing images of a real-life object with essential features, in accordance with some embodiments of the present disclosure.

Referring now to FIG. 2, an exemplary process 200 for generating recommendations for capturing images of a real-life object with essential features is depicted via a flow chart, in accordance with some embodiments of the present disclosure. Each step of the process 200 may be performed by a recommendation device 101 in conjunction with the AR imaging device 108. FIG. 2 is explained in conjunction with FIG. 1.

As illustrated, at step 201, an Augmented Reality (AR) plane may be detected for a target object 109. The AR plane may be detected based on a cluster of feature points. Further, it should be noted that the cluster of feature points may appear to lie on a common horizontal surface or on a common vertical surface. The AR plane detecting module 103 may be used to perform this step. Further, in some embodiments, an input 102 may be received from a user 110 in real time. The input 102 includes an indication of the target object 109 on the AR imaging device 108. Upon detection of the AR plane, a boundary of the AR plane may be detected.

Thereafter, at step 202, a set of poses corresponding to the target object 109 and a set of coordinate points in the AR plane may be captured using the object pose detecting module 104. It should be noted that the set of poses may include a tracking marker. Also, it should be noted that the set of coordinate points may indicate a location of the target object 109.

At step 203, an instant distance between the AR imaging device 108 and the target object 109, and an instant angle of the AR imaging device 108 with respect to the target object 109 may be determined. The angle and distance computing module 105 may be used to perform this step. To determine the instant distance, the set of co-ordinate points may be considered. Further, to determine the instant angle, the set of poses and the tracking marker may be considered. Further, the instant angle may be at least one of a horizontal angle and a vertical angle. The horizontal angle may cover at least a part of a three-sixty-degree view of the target object 109 from a front side or a rear side. Similarly, the vertical angle may cover at least a part of the three-sixty-degree view of the target object 109 from a top side or a bottom side.

Further, at step 204, the recommendations 111 may be generated dynamically for adjusting a position and an orientation of the AR imaging device 108 with respect to the target object 109. The guided content capturing module 106 may be employed for generating the recommendations 111. It should be noted that the recommendations 111 may be generated based on the instant distance and the instant pose, to capture a plurality of images of the target object 109. The plurality of images may include essential features of the target object 109. In other words, the recommendations 111 may be generated in such a way that the plurality of images of the target object 109 may capture the essential features of the target object 109.

Further, in some embodiments, a plurality of images of the target object 109 may be captured based on the recommendations from a plurality of positions and a plurality of orientations. It should be noted that the plurality of images may be employed to generate a three-dimensional (3D) virtual image of the target object 109. Additionally, in some embodiments, the 3D virtual image of the target object 109 may be overlayed on top of an image captured using the AR imaging device 108. Moreover, in some embodiments, the tracking marker may be placed on the 3D virtual image of the target object 109.

Figure 3:
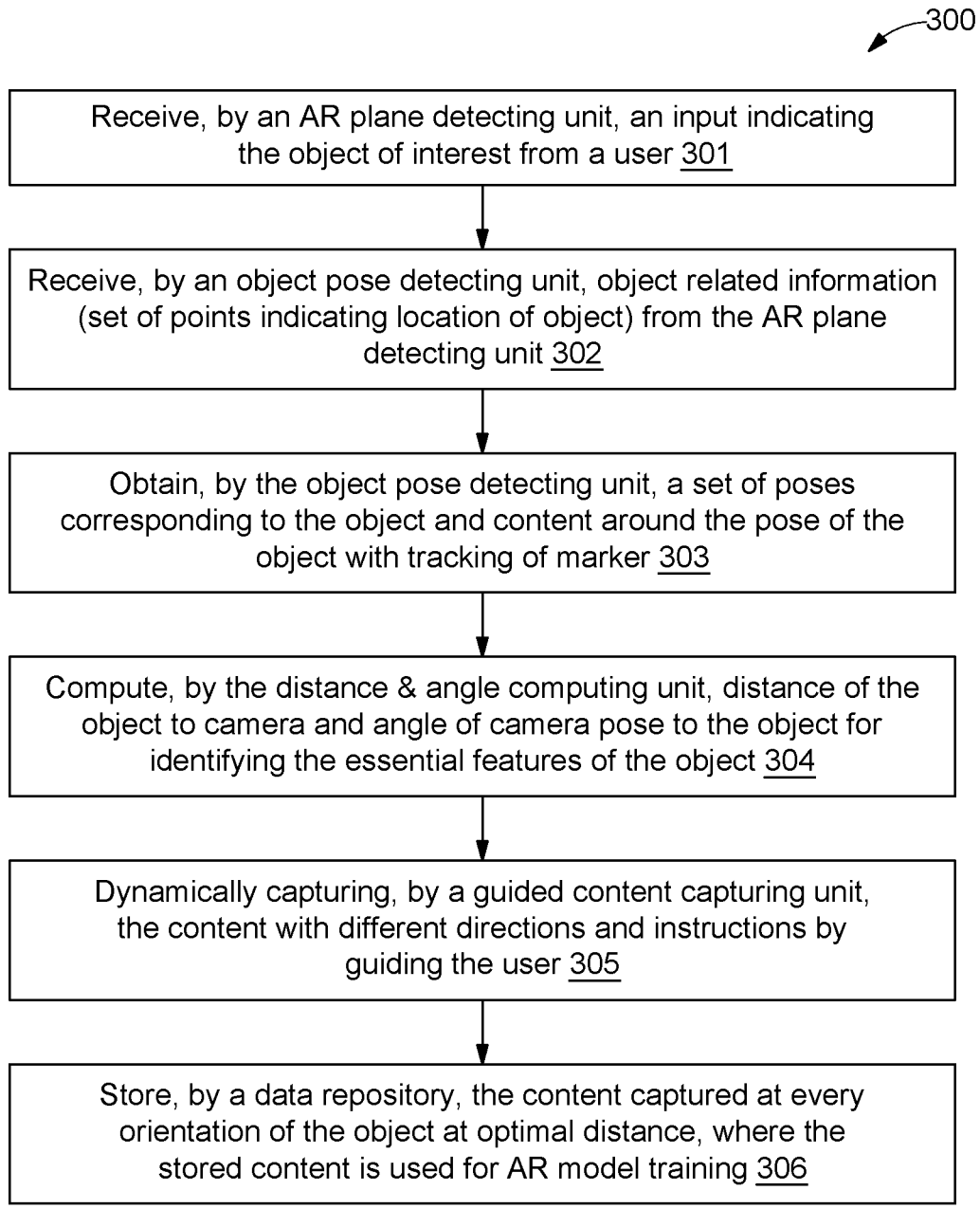
FIG. 3 illustrates a detailed flow diagram of an exemplary process for generating recommendations for capturing images of a real-life object with essential features, in accordance with some embodiment of the present disclosure.

Referring now to FIG. 3, detailed exemplary process 300 for generating recommendations 111 for capturing images of a real-life object 109 with essential features is depicted via a flow chart, in accordance with some embodiments of the present disclosure. Each step of the process 300 may be performed by various modules 103-106 of the recommendation device 101 in conjunction with the AR imaging device 108. FIG. 3 is explained in conjunction with FIGS. 1-2.

At step 301, the input 101 indicating an object of interest may be received from a user. The input may be received by the AR plane detecting module 103. After receiving the input, an AR plane and the object of interest may be identified. In an embodiment, understanding of real-world environment may be constantly improved by detecting feature points and planes. The AR plane may be detected based on clusters of feature points that appear to lie on common horizontal or vertical surfaces (for example, on tables or walls). Further, in some embodiments a boundary of the AR plane may be determined. This information may be further used to place virtual objects resting on flat surfaces. For example, in some embodiments, the AR plane detecting module 103 may use a simultaneous localization and mapping (SLAM) to understand the co-ordinates of a device. Further, in some embodiments, visually distinct features (i.e., feature points) in a captured camera image may be detected and used to compute a change in location. This visual information may be then combined with inertial measurements from an Inertial Measurement Unit (IMU) of the device for estimating the pose (i.e., position and orientation) of the camera relative to location coordinates over time.

Further, in some embodiments, pose of a virtual camera that renders three-dimensional (3D) content may be aligned with the pose of the device's camera provided by the AR plane detecting module 103. It may then be used to render virtual content from a correct perspective. The rendered virtual image may then be overlaid on top of the image obtained from the device's camera that may appear as if the virtual content is a part of the real-world.

Once the object is visualized on the AR plane, a marker (such as the tracking marker) may be placed manually on top of the object in accordance with some embodiments of the present disclosure. Further, the marker may be used to track the object, and to compute an angle and a distance of the object from the camera.

At step 302, an object related information (i.e., a set of points indicating location of object) may be obtained by the object pose detecting module 104 from the AR plane detecting module 103. Thereafter, at step 303 a set of poses corresponding to the object and content around the pose of the object may be obtained by the object pose detecting module 104 by tracking the marker. It may be noted that, initially, the plane is detected near the object in real time and the marker is placed on middle of the object. Further, the distance and the angle may be computed from the marker to the camera pose (the AR imaging device). In particular, the camera may be oriented around the object in 360-degree view. Hence, different poses of the object and object content such as images or videos may be captured around the pose of the object with tracking the marker. In some embodiments, the marker may correspond to an anchor.

At step 304, a distance of the object to the camera and an angle of the camera pose to the object may be computed for identifying the essential features of the object. The distance and angle computing module 105 may be used to perform this operation. In some embodiments, object pose information may be received from the object pose detecting module 104. After receiving the object related information, in some embodiments, a user may place the marker on the object of interest. Further, the distance and angle computing module 105 may compute the distance of the object to camera and angle of camera pose to the object. It should be noted that the angle and distance of the object to the camera at different orientations of the object may be computed while capturing the content using AR enabled cameras in real time.

By way of an example, coordinates of a pose corresponding to a mobile camera are (x1, y1, z1) and coordinates of a pose corresponding to the object are (x2, y2, z2), and a distance between both the coordinates is D'. For this example, based on the camera and object poses, the distance 'D' may be computed as per equation 1, given below:

$$D=(x2-x1)^2+(y2-y1)^2+(z2-z1)^2 \qquad \text{equation (1)}$$

Further the angles may be computed based on the distance D', as per equation 2 and equation 3, given below:

$$\text{Horizontal Angle of the object to the camera '}\theta h\text{'} = \sin^{-1}\frac{(x2-x1)}{D} \qquad \text{equation (2)}$$

$$\text{Vertical angle of the object to the camera '}\theta v\text{'} = \sin^{-1}\frac{(y2-y1)}{D} \qquad \text{equation (3)}$$

The horizontal and vertical angles may be computed by geometric calculations. In the AR of 3D coordinates, x-axis may represent horizontal movement and y-axis may represent vertical movement. The horizontal angle may cover entire object orientation in 360-degree view from a front side to a rear side of the object. Further, in some embodiments the horizontal angles may be used for capturing device parts. This may help in creating AR content (for example, for repairing or maintenance of any device). The vertical angles may cover the object from top to bottom (such as at 30 degrees, 90 degrees, and 120 degrees angle of the object). For example, in some embodiments, the vertical angle may be fixed at 30 degrees and content around the object may be captured at this angle. Thus, essential features of the object may be identified and captured to build a training model for object detection. By way of an example, based the vertical angles, procedures for machine repair and maintenance may be created. In short, the horizontal and vertical angles may cover the entire object features and help in generating accurate and efficient object detection models.

At step 305, the content including the essential features of the object may be captured at different directions by providing guided instructions to the user. This step may be performed using the guided content capturing module 106. By way of an example, in an embodiment, a red color marker may be placed on the object, which may be made from a material factory of an AR core. Further, the 3D world object coordinates of the marker may be taken into consideration. The user may capture the content including the essential features under guided instructions provided by the guided content capturing module 106 at different orientation of the objects. While capturing the content, the user may hide the marker and the plane to capture the images and video at different orientations (horizontally and vertically).

The camera may be moved right or left horizontally around the object at different angles such as at 30 degrees, at 60 degrees, and at 90 degrees left, and at 30 degrees, at 60 degrees, and at 90 degrees right. At rear side, the angles may be 30 degrees, at 60 degrees, and at 90 degrees left and 30 degrees, at 60 degrees, and at 90 degrees right. Therefore, a 360-degree view of the object may be covered. Similarly, the camera may be moved from top to down vertically around the object with angle of 60 degrees, 90 degrees, 120 degrees covering the entire object. The angles may be computed at optimal distance of the object. The optimal distance may be computed according to the camera pose and marker of the object.

In some embodiments, the instructions may be provided with arrows. Actual numerical values of distance and angles may be shown on screen which may be helpful for the user to synchronize the poses.

At step 306, the content captured at every orientation of the object at optimal distance may be stored in the data repository 107 which may be further used for AR model training. Further, in some embodiments, the content may be sent to a server for further training and AR content creation. In other word, using the created content, the AR model may be trained and further may be used by the users (for example, to perform repair and maintenance of remote systems). The AR content may be useful for training new users and a used for remote assistance.

It should be noted that the recommendation device 101 has the features of AR core camera, and quality of images and videos is higher as compared to images and videos of a normal camera. Further, the recommendation device 101 may be faster to use for training and generating AR content due to capability of storing images and videos.

The present disclosure may provide many advantages in order to overcome the problems encountered in conventional systems and methods. As discussed above, the present disclosure captures images of a real-life object with essential features. Further the recommendation device 101 of the present disclosure reduces requirement of recordings for the real-life object to be used for training of object detection models for specific AR-VR application by providing guidance to a field personal for such recordings/capturing. Further, the recommendation device 101 helps in capturing and preserving the essential features of the real-life object while performing such recording, thereby enables effective object detection. In this case, guided procedure for dynamically capturing content at different angles and object poses may help the user to create content for any device. Thus, the recommendation device 101 reduces computational complexity in capturing content by the user.

By way of an example, the proposed system 100 may be used to guide the user with various directions and orientations to capture images and videos at various angles. As a result, all the essential features may be captured. These features may further help the user to obtain an accurate object detection model. Further, the system 100 and associated recommendation device 101 helps the user to differentiate bigger and smaller objects with the help of marker, using the AR camera. With the help of the marker, the distance to capture object images and videos may be adjusted based on the size of the objects. Further, the recommendation device 101 guides the user about positional view of the camera with respect to the object at different orientations or angles.

Further, the system 100 and associated recommendation device 101 provides various advantages including AR assistance, real-time instructions, good quality images and videos of the objects, and data saving locally or on remote server. A stepwise guided procedure to capture the images and videos for data acquisition may be provided by the recommendation device 101. Further, the recommendation device 101 may provide real time Instructions based on location and pose of the camera and guides the user for content creation. Moreover, the user may be able to store the content in a gallery of a phone, which may be exported to remote server for training when required bandwidth is available. Once the data received at the server, a machine learning technique may be initiated for training.

The recommendation device 101 generates the content around the object without missing any features of the object which may be helpful for building object detection models. Thus, the trained object detection models may help in creating AR content for the users working at field location. Further, the recommendation device 101 helps in creating device procedures, such as AR procedures for repair and maintenance that may be used to perform and guide the users to perform machine inspection and maintenance.

The disclosure simplifies the content creation with the mobile devices and provides AR assistance for the users to capture the content (such as pictures/videos), reduces manual effort, and helps in capturing the content dynamically.

Figure 4:
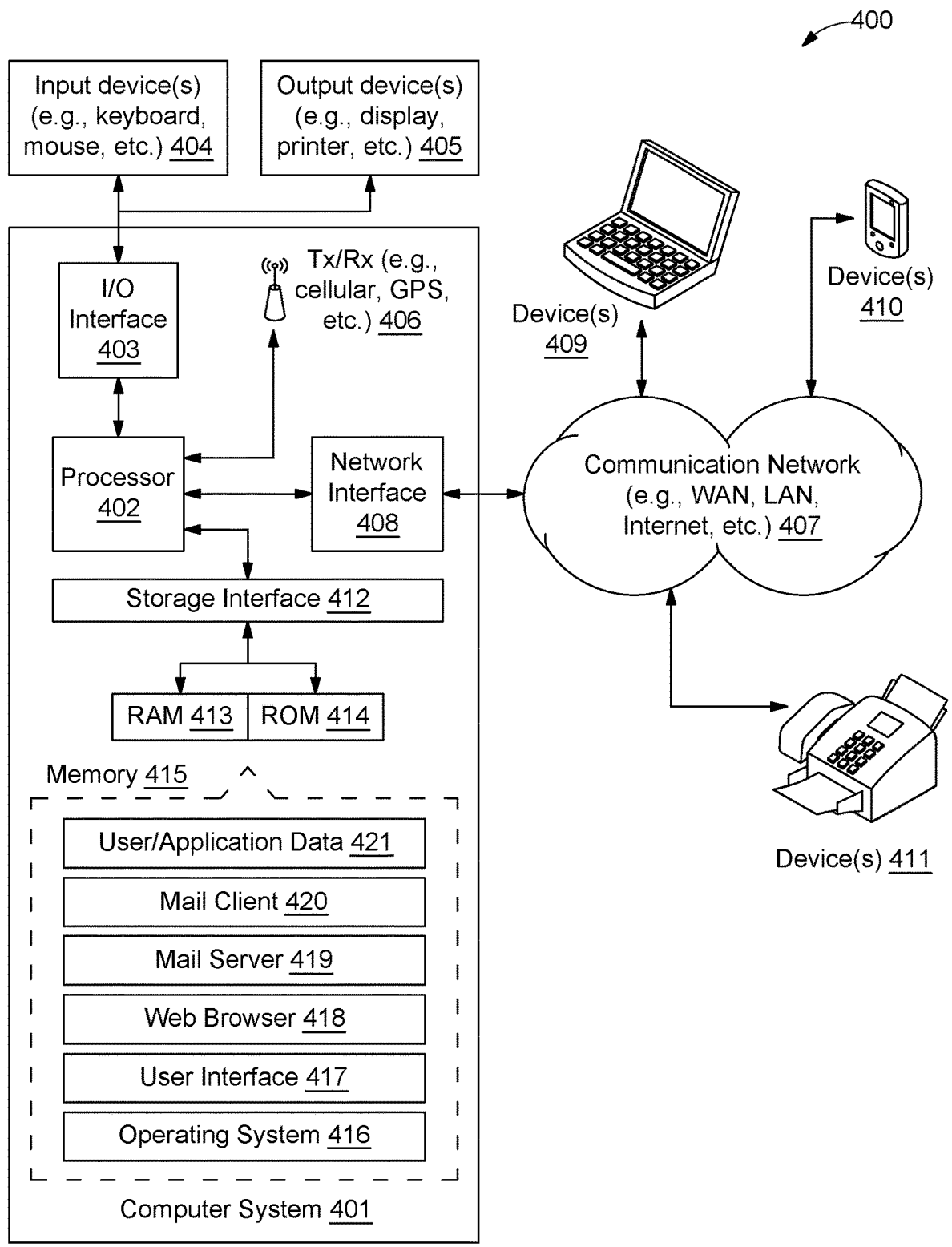
FIG. 4 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing the system 100 for generating recommendations for capturing images of a real-life object with essential features. The computer system 401 may include a central processing unit ("CPU" or "processor") 402. Processor 402 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 407 via a network interface 408. The network interface 408 may communicate with the communication network 407. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 407 may include, without limitation, a direct interconnection, local area network (LAN), wide area network (WAN), wireless network (e.g., using Wireless Application Protocol), the Internet, etc. Using the network interface 408 and the communication network 407, the computer system 401 may communicate with devices 418, 410, and 411. These devices may include, without limitation, personal computer(s), server(s), fax machines, printers, scanners, various mobile devices such as cellular telephones, smartphones (e.g., APPLE® PHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface 412 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IGS®, GOOGLE® ANDROID®, BLACKBERRY® OS, or the like. User interface 417 may facilitate display, execution, interaction, manipulation, or operation of program components through textual or graphical facilities.

For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 401 may implement a web browser 418 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 401 may implement a mail server 419 stored program component. The mail server may be an Internet mail server such as MICROSOFT® EXCHANGE®, or the like. The mail server may utilize facilities such as ASP, ActiveX, ANSI C++/C #, MICROSOFT .NET® CGI scripts, JAVA®, JAVASCRIPT®, PERL®), PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 401 may implement a mail client 420 stored program component. The mail client 420 may be a mail viewing application, such as APPLE MAIL®, MICROSOFT ENTOURAGE®, MICROSOFT OUTLOOK®, MOZILLA THUNDERBIRD®, etc.

In some embodiments, computer system 401 may store user/application data 421, such as the data, variables, records, etc. (e.g., training dataset, test dataset, deep learning model, correctly predicted test dataset, incorrectly predicted test dataset, neuron activation patterns data, activation vectors data, prediction validation model, input data, prediction/determined data, verdict data, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described system and method for generating recommendations for capturing images of a real-life object with essential features. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating recommendations for capturing images of a real-life object with essential features, the method comprising:
    detecting, by a recommendation device and through an AR imaging device, an Augmented Reality (AR) plane for a target object, based on a cluster of feature points that appear to lie on a common horizontal surface or on a common vertical surface;
    capturing, by the recommendation device and through the AR imaging device, a set of poses corresponding to the target object and content around pose of the target object and a set of coordinate points in the AR plane, wherein the set of poses comprises a tracking marker and wherein the set of coordinate points indicates a location of the target object;
    determining, by the recommendation device, an instant distance between the AR imaging device and the target object based on the set of co-ordiante points, and an instant angle of the AR imaging device with respect to the target object based on the set of poses and the tracking marker; and
    dynamically generating, by the AR imaging device, the recommendations for adjusting a position and an orientation of the AR imaging device with respect to the target object, based on the instant distance and the instant pose, to capture a plurality of images of the target object that include essential features of the target object.

2. The method of claim 1, wherein the instant angle comprises at least one of a horizontal angle and a vertical angle, wherein the horizontal angle covers at least a part of a three-sixty-degree view of the target object from a front side or a rear side, and wherein the vertical angle covers at least a part of the three-sixty-degree view of the target object from a top side or a bottom side.

3. The method of claim 1, further comprising receiving an input from a user in real time, wherein the input comprises an indication of the target object on the AR imaging device.

4. The method of claim 1, further comprising:
    dynamically capturing a plurality of images of the target object based on the recommendations from a plurality of positions and a plurality of orientations, wherein the plurality of images is employed to generate a three-dimensional (3D) virtual image of the target object; and
    storing the 3D virtual image of the target object in a datastore associated with the recommendation device for training an AR model, wherein the AR model, upon training, is employed to provide the recommendations during subsequent recommendations.

5. The method of claim 1, further comprising determining a boundary of the AR plane upon detecting the AR plane.

6. The method of claim 4, further comprising:
    overlaying the 3D virtual image of the target object on top of an image captured using the AR imaging device; and
    placing the tracking marker on the 3D virtual image of the object.

7. A system for generating recommendations for capturing images of a real-life object with essential features, the system comprising:
    a processor; and
    a memory communicatively coupled to the processor, wherein the memory stores processor-executable instructions, which, on execution, causes the processor to:
        detect an Augmented Reality (AR) plane for a target object, based on a cluster of feature points that appear to lie on a common horizontal surface or on a common vertical surface;
        capture a set of poses corresponding to the target object and content around pose of the target object and a set of coordinate points in the AR plane, wherein the set of poses comprises a tracking marker and wherein the set of coordinate points indicates a location of the target object;
        determine an instant distance between the AR imaging device and the target object based on the set of co-ordinate points, and an instant angle of the AR imaging device with respect to the target object based on the set of poses and the tracking marker; and
        dynamically generate the recommendations for adjusting a position and an orientation of the AR imaging device with respect to the target object, based on the instant distance and the instant pose, to capture a plurality of images of the target object that include essential features of the target object.

8. The system of claim 7, wherein the instant angle comprises at least one of a horizontal angle and a vertical angle, wherein the horizontal angle covers at least a part of a three-sixty-degree view of the target object from a front side or a rear side, and wherein the vertical angle covers at least a part of the three-sixty-degree view of the target object from a top side or a bottom side.

9. The system of claim 7, wherein the processor-executable instructions further cause the processor to receive an input from a user in real time, wherein the input comprises an indication of the target object on the AR imaging device.

10. The system of claim 7, wherein the processor executable instructions further cause the processor to:
dynamically capture a plurality of images of the target object based on the recommendations from a plurality of positions and a plurality of orientations, wherein the plurality of images is employed to generate a three-dimensional (3D) virtual image of the target object; and
store the 3D virtual image of the target object in a datastore associated with the recommendation device for training an AR model, wherein the AR model, upon training, is employed to provide the recommendations during subsequent recommendations.

11. The system of claim 7, wherein the processor-executable instructions further cause the processor to determine a boundary of the AR plane upon detecting the AR plane.

12. The system of claim 10, wherein the processor-executable instructions further cause the processor to:
overlay the 3D virtual image of the target object on top of an image captured using the AR imaging device; and
place the tracking marker on the 3D virtual image of the object.

13. A non-transitory computer-readable medium having stored thereon a set of computer-executable instructions for generating recommendations for capturing images of a real-life object with essential features, the set of computer-executable instructions causing a computer comprising one or more processors to perform steps comprising:
detecting an Augmented Reality (AR) plane for a target object, based on a cluster of feature points that appear to lie on a common horizontal surface or on a common vertical surface;
capturing a set of poses corresponding to the target object and content around pose of the target object and a set of coordinate points in the AR plane, wherein the set of poses comprises a tracking marker and wherein the set of coordinate points indicates a location of the target object;
determining an instant distance between the AR imaging device and the target object based on the set of coordinate points, and an instant angle of the AR imaging device with respect to the target object based on the set of poses and the tracking marker; and
dynamically generating the recommendations for adjusting a position and an orientation of the AR imaging device with respect to the target object, based on the instant distance and the instant pose, to capture a plurality of images of the target object that include essential features of the target object.

14. The non-transitory computer-readable medium of claim 13, wherein the instant angle comprises at least one of a horizontal angle and a vertical angle, wherein the horizontal angle covers at least a part of a three-sixty-degree view of the target object from a front side or a rear side, and wherein the vertical angle covers at least a part of the three-sixty-degree view of the target object from a top side or a bottom side.

15. The non-transitory computer-readable medium of claim 13, wherein the steps further comprise receiving an input from a user in real time, wherein the input comprises an indication of the target object on the AR imaging device.

16. The non-transitory computer-readable medium of claim 13, wherein the steps further comprise:
dynamically capturing a plurality of images of the target object based on the recommendations from a plurality of positions and a plurality of orientations, wherein the plurality of images is employed to generate a three-dimensional (3D) virtual image of the target object; and
storing the 3D virtual image of the target object in a datastore associated with the recommendation device for training an AR model, wherein the AR model, upon training, is employed to provide the recommendations during subsequent recommendations.

17. The non-transitory computer-readable medium of claim 13, wherein the steps further comprise determining a boundary of the AR plane upon detecting the AR plane.

18. The non-transitory computer-readable medium of claim 16, wherein the steps further comprise:
overlaying the 3D virtual image of the target object on top of an image captured using the AR imaging device; and
placing the tracking marker on the 3D virtual image of the object.

* * * * *